(12) United States Patent
Vilag et al.

(10) Patent No.: US 9,476,752 B2
(45) Date of Patent: Oct. 25, 2016

(54) FLUID LEVEL SENSOR

(71) Applicant: SEALED AIR CORPORATION, Elmwood, NJ (US)

(72) Inventors: Brian Vincent Vilag, Naugatuck, CT (US); Kenneth Mierzejewski, Harwinton, CT (US)

(73) Assignee: Sealed Air Corporation, Elmwood, NJ (US)

( * ) Notice: Subject to any disclaimer, the term of this patent is extended or adjusted under 35 U.S.C. 154(b) by 0 days.

(21) Appl. No.: 14/504,136

(22) Filed: Oct. 1, 2014

(65) Prior Publication Data

US 2016/0097668 A1   Apr. 7, 2016

(51) Int. Cl.
*G01F 23/26* (2006.01)
*B67D 7/32* (2010.01)

(52) U.S. Cl.
CPC ........... *G01F 23/263* (2013.01); *B67D 7/3272* (2013.01); *G01F 23/265* (2013.01); *G01F 23/268* (2013.01); *G01F 23/266* (2013.01)

(58) Field of Classification Search
CPC .. G01F 23/263; G01F 23/265; G01F 23/268; G01F 23/266; B67D 7/3272
USPC ........................................... 222/65; 73/304 C
See application file for complete search history.

(56) References Cited

U.S. PATENT DOCUMENTS

| | | | |
|---|---|---|---|
| 4,021,707 A | 5/1977 | Ehret et al. | |
| 4,296,630 A | 10/1981 | Jung et al. | |
| 4,373,389 A | 2/1983 | Decker | |
| 4,590,575 A * | 5/1986 | Emplit | G01F 25/0061 702/52 |
| 5,017,909 A * | 5/1991 | Goekler | G01F 23/265 340/620 |

(Continued)

FOREIGN PATENT DOCUMENTS

| | | |
|---|---|---|
| DE | 102007001175 A1 | 7/2008 |
| EP | 1961575 A2 | 8/2008 |

(Continued)

OTHER PUBLICATIONS

Baxter, Larry K., "Capacitive Sensors: Design and Applications", available at <http://books.google.com/books?id=Tjd2laRnO4wC&pg=PA140&lpg=PA140&dq=designing+capacitor+sensor+for+capacitive+sensing+fluid+level+detection&source=bl&ots=Nv1ZtiuzY2&sig=ymNcYVrD6n3XeGu7a5z5jGkY-o0&hl=en&sa=X&ei=38whU-6PHsaOrQHUwoHwBA&ved=0CEgQ6AEwBA#v=onepage&q=designing%20-capacitor%20sensor%20for%20capacitive%20sensing%20-fluid%20level%20detection&f=false>, Sep. 3, 1996, John Wiley & Sons, USA.

Gill Sensors, "How Capacitive Liquid Level Sensors Work", *YouTube*, <http://www.youtube.com/watch?v=0du-QU1Q0T4>, May 30, 2013.

(Continued)

*Primary Examiner* — Donnell Long
(74) *Attorney, Agent, or Firm* — Alston & Bird LLP

(57) ABSTRACT

A capacitive fluid level sensor is provided for receiving data indicative of the level of fluid remaining in a fluid container. In various embodiments, the capacitive fluid level sensor may be spaced below and a distance away from the fluid container to be measured, and may comprise a fluid level sensor and an ambient sensor, wherein the fluid level sensor and the ambient sensor are coplanar. In various embodiments, the ambient sensor may be spaced a distance away from the fluid level sensor, such that electric fields generated by the fluid level sensor and the ambient sensor, respectively, do not overlap. Based at least in part on capacitance levels determined by the fluid level sensor and the ambient sensor, the fluid level sensor may generate data indicative of the fluid level in at least a portion of the fluid container located above the fluid level sensor.

23 Claims, 11 Drawing Sheets

(56) References Cited

U.S. PATENT DOCUMENTS

| | | | |
|---|---|---|---|
| 6,125,696 A | 10/2000 | Hannan et al. | |
| 6,490,920 B1* | 12/2002 | Netzer | G01C 9/06 324/687 |
| 6,529,017 B2* | 3/2003 | Martin | G01F 23/26 324/669 |
| 6,539,797 B2* | 4/2003 | Livingston | G01F 23/268 73/290 R |
| 8,161,814 B2* | 4/2012 | Calcote | G01F 23/265 73/1.02 |
| 8,501,061 B2 | 8/2013 | Sperry et al. | |
| 8,590,375 B2* | 11/2013 | Farmanyan | G01F 23/263 324/668 |
| 8,659,306 B2 | 2/2014 | Bruwer et al. | |
| 2001/0000851 A1* | 5/2001 | Morimoto | G01F 23/266 73/304 C |
| 2010/0121257 A1* | 5/2010 | King | A61M 1/0058 604/22 |
| 2011/0314907 A1* | 12/2011 | Wiedekind-Klein | G01F 23/268 73/304 C |
| 2012/0167660 A1 | 7/2012 | Calcote | |
| 2013/0276533 A1 | 10/2013 | Wilder et al. | |
| 2014/0076923 A1 | 3/2014 | Clark et al. | |

FOREIGN PATENT DOCUMENTS

| | | |
|---|---|---|
| EP | 2645070 A2 | 10/2013 |
| WO | WO 2008/119993 A1 | 10/2008 |
| WO | WO 2010/045662 A2 | 4/2010 |

OTHER PUBLICATIONS

Analog Devices, Inc., "AD7150 Capacitance Converter for Proximity Sensing", Copyright 2008, retrieved from <http://www.analog.com/static/imported-files/overviews/AD7150_Capacitance_ConverterFINAL.pdf> on Oct. 20, 2014, 2 pages, USA.

Lanka, et al., "Use capacitive sensing to Implement reliable liquid level sensing—Part I", Jul. 18, 2012, EE|Times, retrieved from < http://www.eetimes.com/document.asp?doc_id=1279770&page_number=2> on Oct. 20, 2014, 4 pages.

International Searching Authority, International Search Report and Written Opinion for International Application No. PCT/US2015/036626, Oct. 16, 2015, 12 pages, European Patent Office, The Netherlands.

Sealed Air Corporation, "Sealed Air Product Care: Instapak® Simple™, Foam-in-Bag Packaging System", Copyright 2014, retrieved from <http://www.sealedairprotects.com/NA/EN/Pdf/InstapakSimple.pdf> on Oct. 17, 2014, 2 pages.

Sealed Air Corporation, "Instapak® Foam Packaging", Copyright 2013, retrieved from <http://www.sealedairprotects.com/NA/EN/products/foam_packaging/instapak.aspx> on Oct. 17, 2014, 1 page.

Sealed Air Corporation, "Instapak® Foam: Versatile", Copyright 2011, retrieved from <http://www.sealedairprotects.com/NA/EN/Pdf/instapak_gen.pdf> on Oct. 17, 2014, 16 pages.

Steven Engineering, Inc., "Turck Sensors: Section H—Capacitive Sensors" Oct. 15, 2011 to Jul. 29, 2014 Internet Archive of <http://stevenengineering.com/tech_support/PDFs/46SENHCAP.pdf> retrieved on Oct. 17, 2014, 50 pages.

\* cited by examiner

FLUID LEVEL SENSOR

BACKGROUND OF THE INVENTION

1. Field of the Invention

The present invention relates generally to the field of capacitive fluid level detection for determining a volume of fluid in a container, such as a container used in a fluid dispensing system.

2. Description of Related Art

In various industries, fluid level sensors are used to determine the amount of fluid remaining in a container. For example, fluid level sensors have historically been utilized to indicate the level of fuel in a vehicle or the amount of beverage left in a carafe. Moreover, when employed in an automated mechanism, fluid level sensors may be used to determine when to perform a particular automated action.

Known fluid level sensors include capacitive fluid level sensors, which rely on the different dielectric properties of air and fluids in order to detect the presence or absence of fluid at a particular location within a container. For example, existing capacitive fluid level sensors include electrodes configured to apply an electric field at a plurality of locations along the height of a container. By measuring the capacitance at each of the plurality of vertical locations, the sensor can determine the fluid level within the container based on the differences among the measured capacitances.

However, such known fluid level capacitive sensors have installation requirements that make them impractical in many applications. For example, many capacitive fluid level sensors must have at least one electrode placed within the measured fluid itself in order to obtain accurate fluid level readings. Inserting a capacitor with exposed electrodes directly into a fluid may be difficult, or even dangerous, for volatile fluids within an enclosed container. Moreover, if access to the interior of the container is inhibited or prevented, it may be difficult or impossible to insert these sensors into the container.

In addition, many fluid level sensors require that at least one electrode be coupled to the exterior surface of the fluid container (e.g., immediately adjacent to the exterior surface of the fluid container). However, requiring sensors to be coupled to the external surface of the fluid container can be challenging where the sensors are used with removable fluid containers that are frequently installed or removed from a fluid dispensing machine, fluid containers positioned in difficult-to-access locations, and the like. As a result, there is often design complication, cost increase, and degraded user experience associated with apparatuses using such sensors. Therefore, a need exists for an improved fluid level sensor that may obtain accurate fluid level measurements and is capable of being more conveniently positioned relative to the fluid container being measured.

BRIEF SUMMARY

Various embodiments of the present invention are directed to a fluid dispensing system comprising: a container defining an internal fluid volume configured for storing and dispensing fluid; a target capacitance sensor comprising a target transmitter electrode and a target receiver electrode that are coplanar with one another and positioned a distance away from the container, the target capacitance sensor being configured to generate a target electric field to detect a capacitance of a target zone comprising a target portion of the container's internal fluid volume; an ambient capacitance sensor comprising an ambient transmitter electrode and an ambient receiver electrode that are positioned a distance away from the container, the ambient capacitance sensor being configured to generate an ambient electric field to detect a capacitance of an ambient zone outside of the container; and one or more processors in communication with the target capacitance sensor and the ambient capacitance sensor, the one or more processors configured to generate a signal indicative of the level of fluid present within the internal fluid volume based at least in part on the capacitance detected by the target capacitance sensor and the capacitance detected by the ambient capacitance sensor. In various embodiments, the target capacitance sensor is positioned such that it is aligned with the target portion of the container, and the ambient capacitance sensor is positioned such that it is not aligned with the container. Moreover, in various embodiments the target capacitance sensor is aligned with the target portion of the container such that a vertical axis perpendicular to a face of the target transmitter electrode extends through the target portion of the container and the target capacitance sensor. Additionally, in various embodiments the ambient transmitter electrode and the ambient receiver electrode are coplanar with one another and coplanar with the target transmitter electrode and the target receiver electrode. In certain embodiments the target zone and the ambient zone do not substantially overlap. The fluid dispensing system may additionally comprise a housing configured to receive the container, and wherein: the container is removable from the housing; and the target capacitance sensor and ambient capacitance sensor are provided on a printed circuit board secured to the housing.

In various embodiments, the signal indicative of the level of fluid present within the internal fluid volume comprises a signal indicating that the level of fluid in the internal fluid volume is less than a predefined threshold fluid level. In various embodiments, the one or more processors are additionally configured to determine a differential capacitance based at least in part on the capacitance detected by the target capacitance sensor and the capacitance detected by the ambient capacitance sensor; monitor changes in the differential capacitance over time; and generate a signal indicative of the level of fluid present within the internal fluid volume upon determining that the differential capacitance has changed more than a threshold amount over a predefined increment of time. Upon a determination that the differential capacitance has changed more than a threshold amount over a predefined increment of time, the one or more processors may be additionally configured to disable a pump configured to selectively remove fluid from the fluid container.

In various embodiments, the fluid dispensing system may additionally include a second container defining a second internal fluid volume configured for storing and dispensing fluid; and a second target capacitance sensor comprising a second target transmitter electrode and a second target receiver electrode that are coplanar with one another and positioned a distance away from the second container, the second target capacitance sensor being configured to generate a second target electric field to detect a capacitance of a second target zone comprising a target portion of the second container's second internal fluid volume; and wherein the one or more processors are in communication with the second target capacitance sensor and the ambient capacitance sensor, the one or more processors configured to generate a signal indicative of the level of fluid present within the second internal fluid volume based at least in part on the capacitance detected by the second target capacitance sensor and the capacitance detected by the ambient capacitance sensor. In various embodiments the second target capacitance sensor is positioned such that it is aligned with the target portion of the second container, and wherein the ambient capacitance sensor is positioned such that it is not aligned with the second container.

In various embodiments the ambient capacitance sensor comprises: (1) a first ambient capacitance sensor comprising the ambient transmitter electrode and the ambient receiver electrode; and (2) a second ambient capacitance sensor comprising a second ambient transmitter electrode and a second ambient receiver electrode that are positioned a distance away from the second container, the second ambient capacitance sensor being configured to generate a second ambient electric field to detect a capacitance of a second ambient zone outside of the second container; and the one or more processors are in communication with the first target capacitance sensor, the first ambient capacitance sensor, the second target capacitance sensor, and the second ambient capacitance sensor, the one or more processors configured to generate a signal indicative of the level of fluid present within the second internal fluid volume based at least in part on the capacitance detected by the second target capacitance sensor and the capacitance detected by the second ambient capacitance sensor. In various embodiments the first target capacitance sensor, first ambient capacitance sensor, second ambient capacitance sensor, and second target capacitance sensor are coplanar with one another.

Alternative embodiments of the present invention are directed to a capacitive fluid level sensing device comprising: (1) a target capacitance sensor comprising a target transmitter electrode and a target receiver electrode that are coplanar with one another, the target capacitance sensor being configured to generate a target electric field to detect a target capacitance of a target zone; (2) an ambient capacitance sensor comprising an ambient transmitter electrode and an ambient receiver electrode that are coplanar with one another and coplanar with the target transmitter electrode and the target receiver electrode, the ambient capacitance sensor being configured to generate an ambient electric field to detect an ambient capacitance of an ambient zone, wherein the ambient zone does not substantially overlap the target zone; and (3) one or more processors configured to determine a combined capacitance measurement based at least in part on a differential between the target capacitance and the ambient capacitance and generate a signal indicative of the combined capacitance measurement. In various embodiments, the combined capacitance measurement is a differential between the target capacitance and the ambient capacitance. Additionally, the combined capacitance measurement is a differential between the target capacitance and the ambient capacitance.

In various embodiments, the capacitive fluid level sensing device may additionally comprise a second target capacitance sensor comprising a second target transmitter electrode and a second target receiver electrode that are coplanar with one another, the second target capacitance sensor being configured to generate a second target electric field to detect a second target capacitance of a second target zone; and the one or more processors are additionally configured to determine a second combined capacitance measurement based at least in part on the second target capacitance and the ambient capacitance. In various embodiments the target electric field and the second target electric field are alternatingly generated.

Moreover, in various embodiments the ambient capacitance sensor comprises a first ambient capacitance sensor comprising the ambient transmitter electrode and the ambient receiver electrode; and a second ambient capacitance sensor comprising a second ambient transmitter electrode and a second ambient receiver electrode that are coplanar with one another and coplanar with the first ambient capacitance sensor, the second ambient capacitance sensor being configured to generate a second ambient electric field to detect a second ambient capacitance of a second ambient zone, wherein the second ambient zone does not overlap the second target zone; and the one or more processors are configured to determine the second combined capacitance measurement based at least in part on the second target capacitance and the second ambient capacitance. In various embodiments the first target electric field and the second target electric field are alternatingly generated.

Moreover, in various embodiments, the ambient capacitance sensor comprises a first ambient capacitance sensor comprising the ambient transmitter electrode and the ambient receiver electrode; and a second ambient capacitance sensor comprising a second ambient transmitter electrode and a second ambient receiver electrode that are coplanar with one another and coplanar with the first ambient capacitance sensor, the second ambient capacitance sensor being configured to generate a second ambient electric field to detect a second ambient capacitance of a second ambient zone, wherein the second ambient zone does not overlap the second target zone; and the one or more processors are configured to determine the second combined capacitance measurement based at least in part on the second target capacitance and the second ambient capacitance. Additionally, the target capacitive sensor is spaced a distance away from the ambient capacitive sensor in various embodiments.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
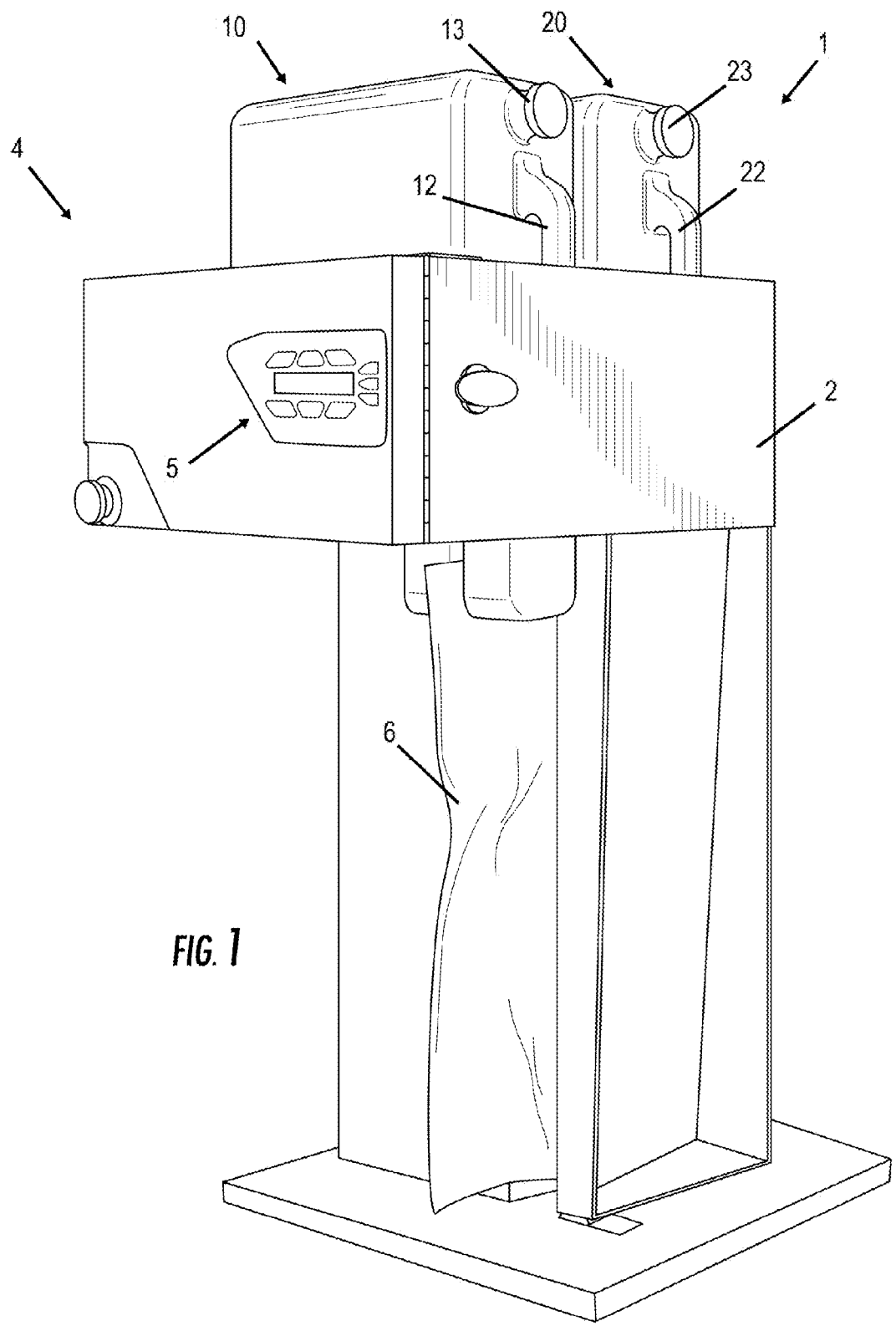
FIG. 1 is a perspective view of a fluid dispensing system according to one embodiment of the present invention.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Overview

A fluid level sensor is provided for monitoring the amount of fluid remaining in a fluid container, such as a fluid container used in a fluid dispensing system. According to various embodiments, the fluid level sensor generally comprises a target sensor and an ambient sensor. The target sensor is configured to obtain a measurement of the capacitance of a targeted portion of the fluid container by generating an electric field between a target transmitter electrode and a target receiver electrode. The ambient sensor is configured to obtain a measurement of the capacitance of an ambient zone located outside of the container by generating an electric field between an ambient transmitter electrode and an ambient receiver electrode. According to various embodiments, the ambient sensor is spaced away from the target sensor such that the ambient sensor detects the capacitance of an ambient zone different from the target zone measured by the target sensor.

The combination of target and ambient sensors enables the target sensor to be positioned some distance away from a lower surface of the fluid container. In this configuration, ambient air existing in the space between the target sensor and the fluid container may impact the measured capacitance determined by the target sensor (e.g., due to changes in humidity or other ambient air conditions). To compensate for this, the difference between the measured capacitance determined by the target sensor and the measured capacitance determined by the ambient sensor can be used to obtain a value indicative of the capacitance of the targeted portion of the fluid container's internal volume (e.g., the capacitance of only the fluid and/or air within the targeted portion of the fluid container, with the capacitance of any ambient space between the sensor and the container factored-out). In this way, a normalized capacitance value that is not influenced by changes in ambient conditions surrounding the fluid container can be determined.

In various embodiments, the fluid level sensor is configured to determine the measured capacitance at a plurality of instances in time and, based on at least a portion of the resulting plurality of readings, also determine a rate of change of the measured capacitance over time. As explained in greater detail herein, the rate of change of the measured capacitance is high where fluid is removed from a container having a small amount of fluid remaining (e.g., where the upper fluid surface is near a lower surface of the fluid volume). As such, the fluid level sensor is configured to compare the rate of change of the measured capacitance against one or more stored rules indicative of a particular fluid level remaining in the fluid container (e.g., one or more threshold rate-of-change values). Upon a determination that the rate of change of the measured fluid capacitance transcends one or more threshold values, one or more response actions may be performed. For example, upon a determination that the rate of change of the measured fluid capacitance transcends a threshold value indicative of the fluid container being substantially empty of fluid, a pump removing fluid from the fluid container may be disabled or deactivated.

Fluid Dispensing System

FIG. 1 illustrates a fluid dispensing system 1 according to one embodiment. As shown in FIG. 1, the fluid dispensing system 1 is configured for dispensing fluid from one or more removable fluid containers. In particular, in the illustrated embodiment, the fluid dispensing system 1 may be configured for dispensing fluid from two fluid containers 10, 20 in order to mix the dispensed fluid and output a foaming liquid that can be injected into a bag 6 (e.g., to make foam-in-bag cushions). As illustrated in FIG. 1, the fluid dispensing system 1 includes a housing 4, a first fluid container 10, and a second fluid container 20. Although the exemplary fluid dispensing system 1 shown in FIG. 1 is configured to accept two fluid containers 10, 20, various embodiments of the present invention may be configured to accept only one fluid container, or may be configured to accept more than two fluid containers.

Figure 2:
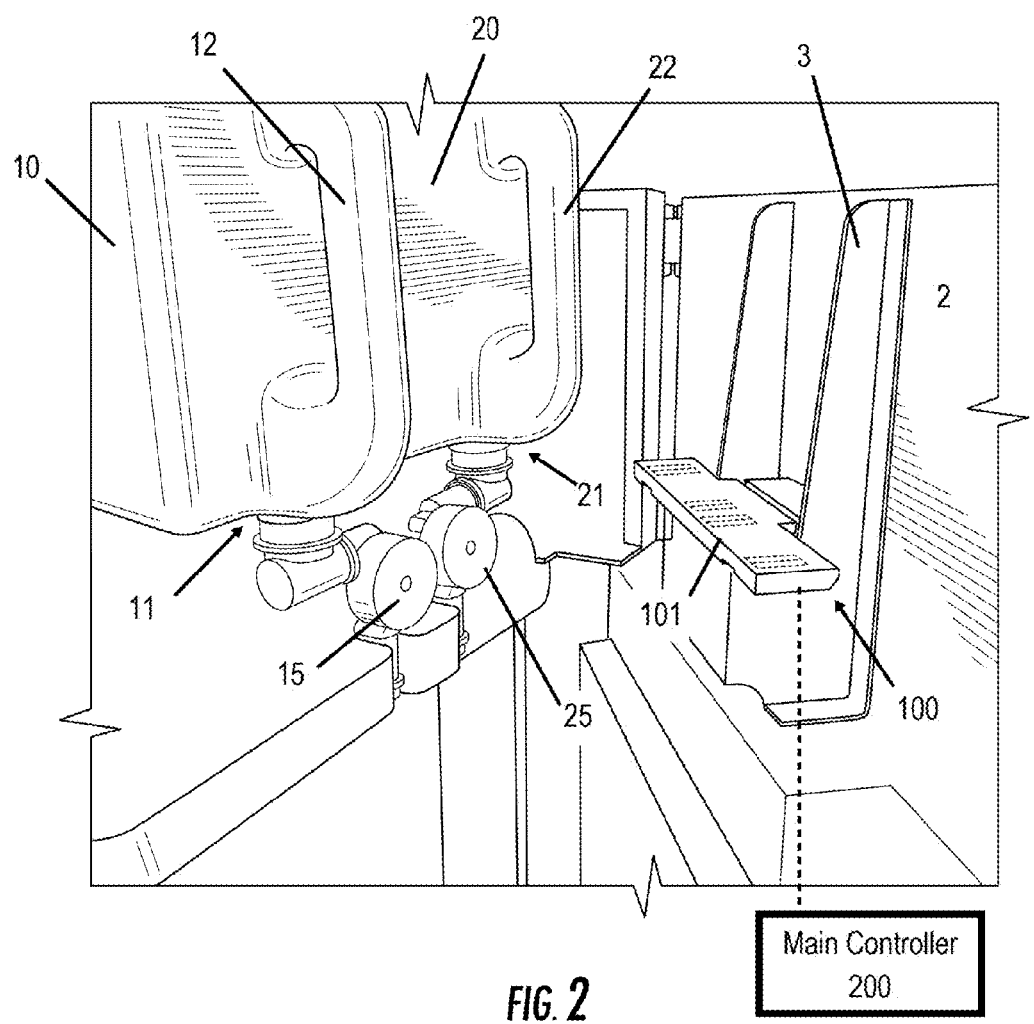
FIG. 2 is a perspective view of the fluid dispensing system with the system's access door opened and shows a fluid level sensor and fluid containers according to one embodiment.
Figure 3:
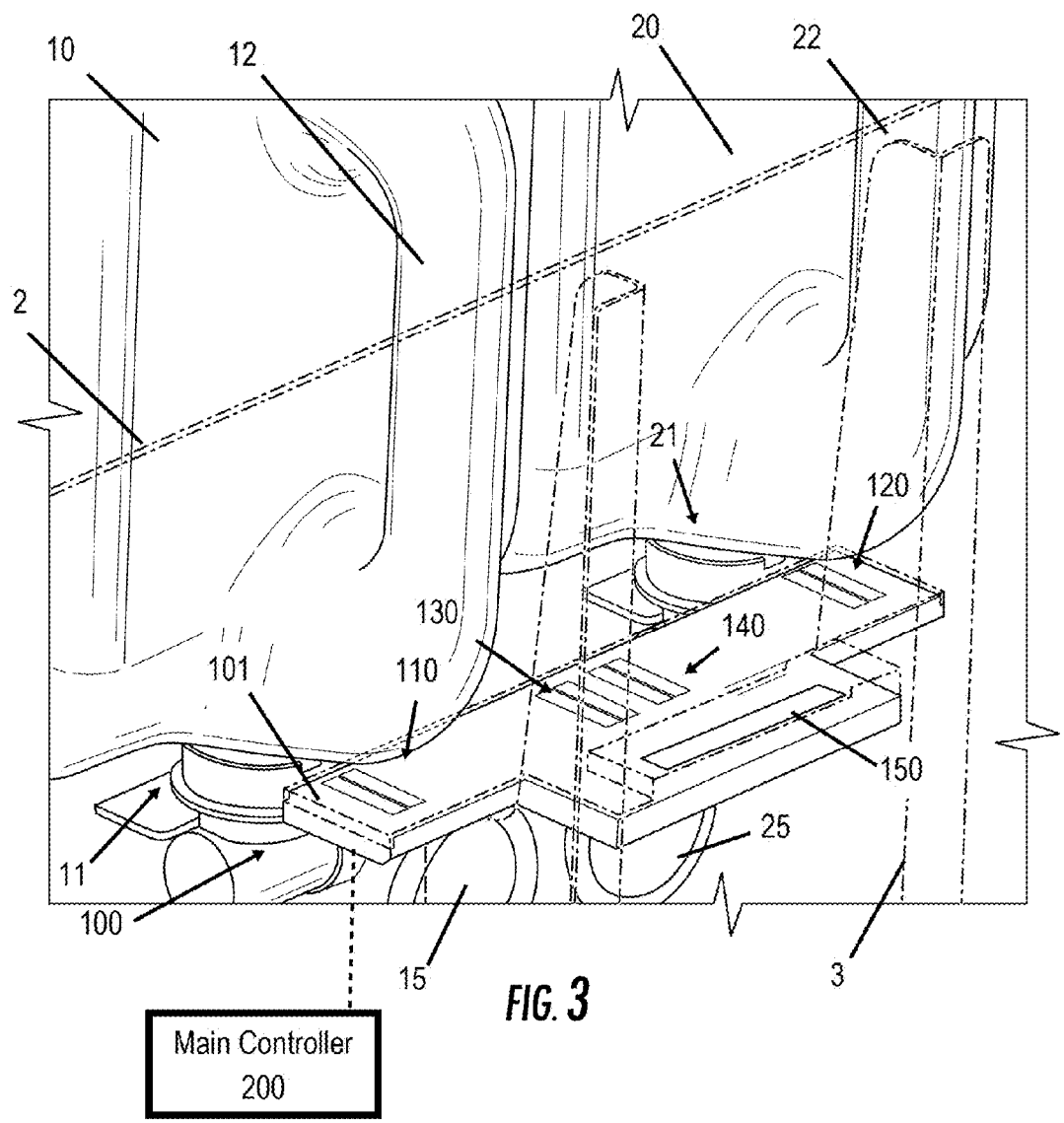
FIG. 3 is a perspective view of the fluid level sensor and fluid containers shown through the access door according to one embodiment.

In various embodiments, the fluid dispensing system's housing 4 includes an access door 2, configured to be moved between a closed position and an open position. As illustrated in FIGS. 1-3, the access door 2 is configured to grant users access to a fluid container installation area within the fluid dispensing system 1. Moreover, as shown in FIG. 1, the fluid dispensing system 1 comprises a user interface 5. As shown in FIG. 1, the user interface 5 may comprise one or more display devices configured for displaying messages to a user, and one or more user input devices (e.g., a button, knob, switch, and/or the like) configured to receive user input for the fluid dispensing system 1.

FIG. 2 shows a fluid container installation area with the access door 2 in an open position. In the illustrated embodiment, the first fluid container 10 and second fluid container 20 are removably installed in the fluid container installation area. The first fluid container 10 and second fluid container 20 each define a fluid volume within the interior of the first fluid container 10 and second fluid container 20. Moreover, in the illustrated embodiment of FIG. 2, the first fluid container 10 and second fluid container 20 are oriented such that a first exit opening 11 of the first fluid container 10 is located on a lower surface of the first fluid container 10 and a second exit opening 21 of the second fluid container 20 is located on a lower surface of the second fluid container 20 when the containers 10, 20 are installed in the fluid dispensing system 1. Referring back to FIG. 1, the first fluid container 10 comprises a first vent opening 13, and the second fluid container 20 comprises a second vent opening 23 located near a top portion of the fluid container, configured to allow ambient air to enter the fluid container as fluid is removed from the fluid container via the exit opening 11, 21.

In the illustrated embodiment of FIG. 2, the exit openings 11, 21 are in fluid communication with a first pump 15 and a second pump 25, respectively. In various embodiments, the pumps 15, 25 may be configured to selectively remove at least a portion of the fluid from the fluid container 10, 20. In various embodiments, the pumps 15, 25 are controlled by a main controller 200 (e.g., such that the pumps 15, 25 are configured to receive signals from the main controller 200 instructing the pump 15, 25 to turn on or turn off). Although illustrated schematically in FIGS. 2-5, various embodiments of the main controller 200 comprise one or more processors located in the fluid dispensing system's housing 4 and which are in communication with the fluid level sensor 100.

Moreover, in various embodiments, the first fluid container 10 comprises a first handle 12, and the second fluid container 20 comprises a second handle 22 extending horizontally away from a front surface of the fluid container 10, 20, away from a main portion of the fluid container. As illustrated in FIG. 2, the handle 12, 22 defines at least a portion of the fluid volume within the fluid container 10, 20, such that fluid may flow freely between an interior portion of the handle 12, 22 and an interior portion of the main portion of the fluid container 10, 20. Thus, the fluid level within the handle may directly correlate to the fluid level in the main portion of the fluid container.

As illustrated in FIG. 2, a fluid level sensor 100 is coupled to the access door 2 via a sensor bracket 3. As will be described in greater detail herein, the sensor bracket 3 supports the fluid level sensor 100 in an at least substantially horizontal position such that an upper surface of the fluid level sensor 100 is proximate a bottom surface of at least one of the fluid containers 10, 20. As shown in FIG. 2, the fluid level sensor 100 comprises a fluid level sensor enclosure 101 surrounding one or more components of the fluid level sensor 100. In various embodiments, the fluid level sensor enclosure 101 may comprise a nonconductive material, such as nylon. Although not shown, the fluid level sensor 100 may be coupled to the sensor bracket 3 via one or more fasteners (e.g., screws, bolts, glue, and/or the like) connecting the fluid level sensor 100 to the sensor bracket 3.

FIG. 3 illustrates the position of the fluid level sensor 100 in relation to the fluid container 10, 20 upon closure of the access door 2. As illustrated in FIG. 3, in which the upper surface of the enclosure 101 is removed for clarity, the fluid level sensor 100 comprises a first target sensor 110, a second target sensor 120, a first ambient sensor 130, and a second ambient sensor 140. However, as will be described in greater detail herein, other embodiments of the fluid level sensor 100 may comprise more, or fewer, sensors than shown in FIG. 3. Each of these sensors may be in electronic communication with a sensor controller 150. As will be described in greater detail herein, the sensor controller 150 comprises one or more processors configured to process and/or analyze signals received from the sensors 110, 120, 130, 140. In the illustrated embodiment of FIG. 3, the first target sensor 110 is positioned below at least a portion of the first fluid container 10 (e.g., below the first fluid container handle 12), and the second target sensor 120 is positioned under the second fluid container 20 (e.g., below the second fluid container handle 22). Moreover, the first target sensor 110 is spaced a distance away from an exterior surface of the first fluid container 10, and the second target sensor 120 is spaced a distance away from an exterior surface of the second fluid container 20.

As will be described in greater detail herein, the first and second ambient sensors 130, 140 may be spaced away from the first target sensor 110 and second target sensor 120, respectively. For example, as shown in FIG. 3, the first and second ambient sensors 130, 140 are positioned horizontally near the center of the fluid level sensor 100, and the first target sensor 110 and second target sensor 120 are positioned horizontally near a first side and a second side of the fluid level sensor 100, respectively.

Fluid Level Sensor

Figure 4A:
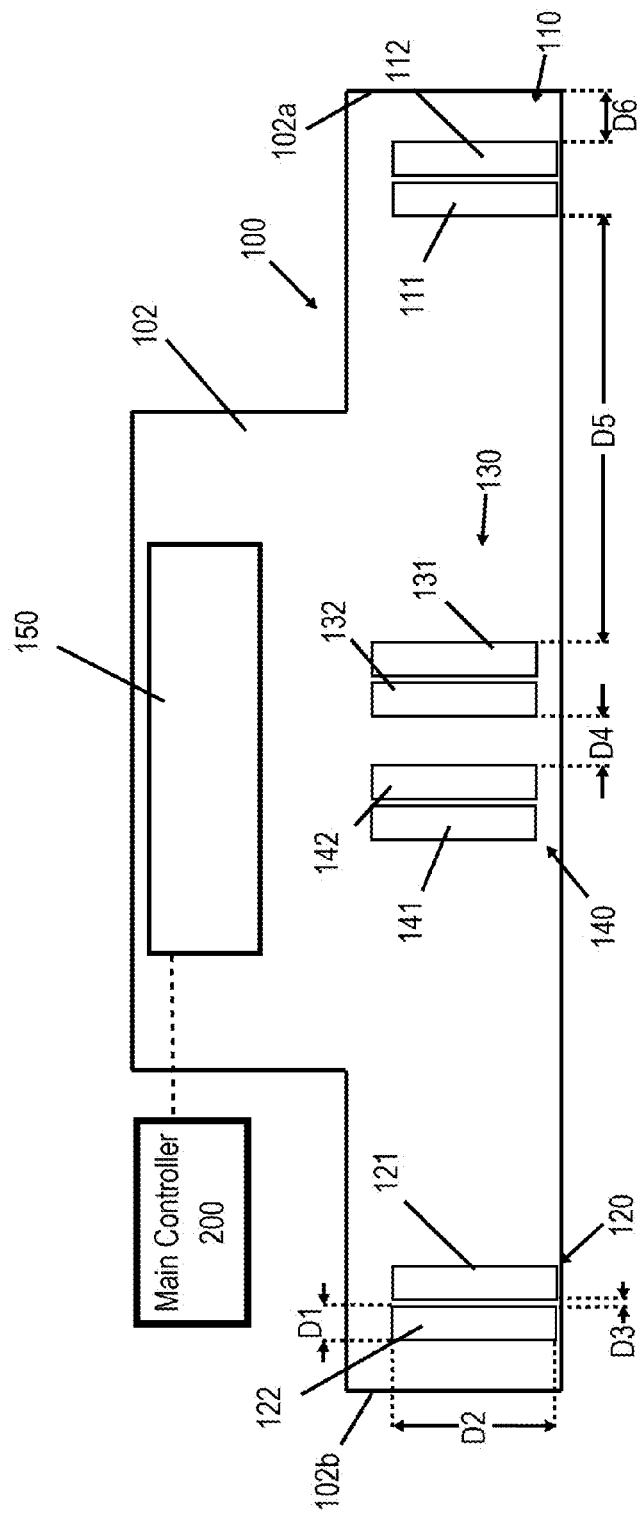
FIG. 4A is a schematic diagram of the fluid level sensor according to one embodiment.
Figure 5:
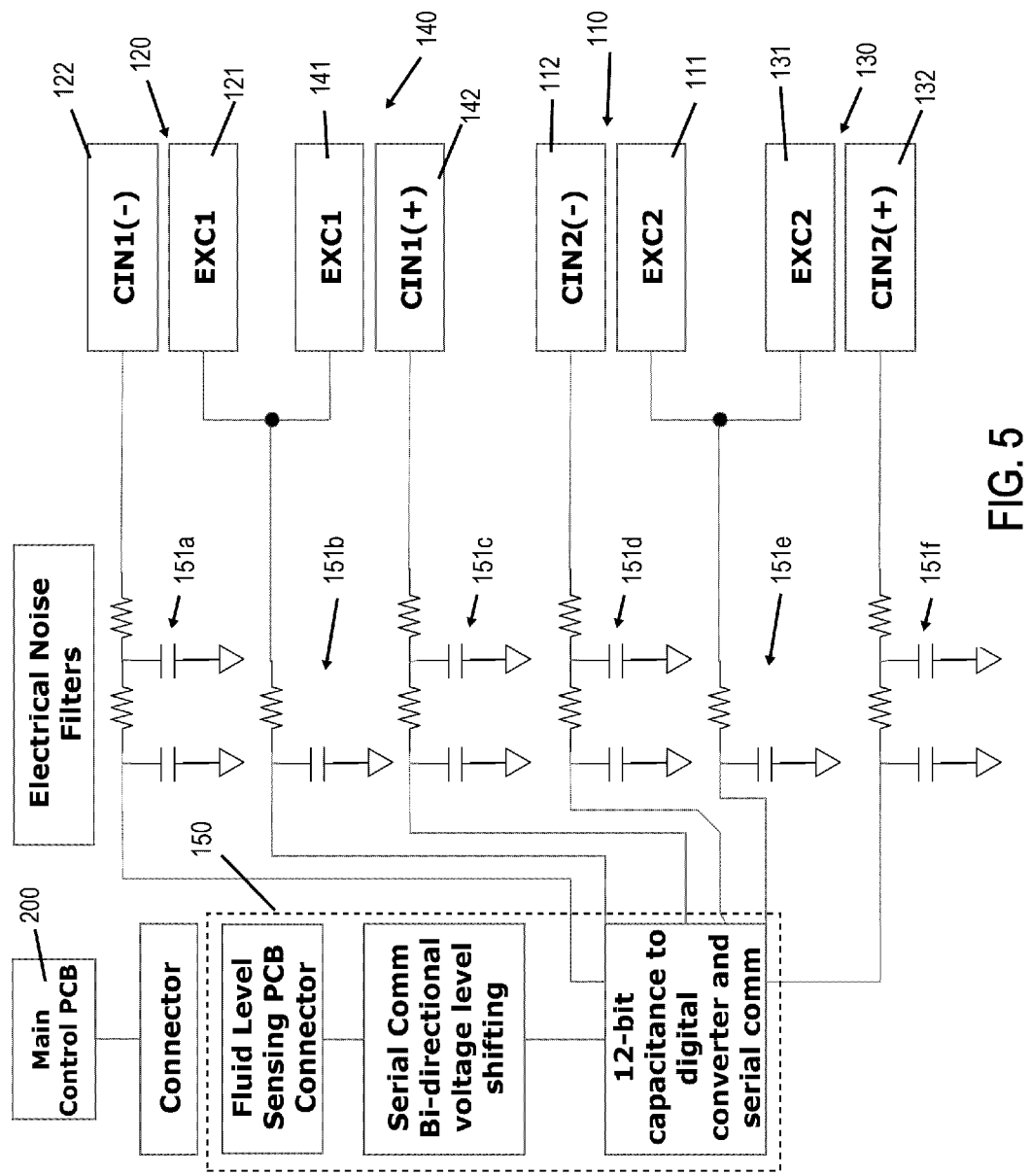
FIG. 5 is a schematic circuit diagram illustrating various components of the fluid level sensor according to one embodiment.

FIGS. 4A and 5 illustrate the fluid level sensor 100. Specifically, FIG. 4A is a schematic diagram of various components of a fluid level sensor 100 according to various embodiments, and FIG. 5 is a step diagram showing electronic communications between various components of a fluid level sensor 100 according to various embodiments of the present invention.

Referring first to FIG. 4A, the fluid level sensor 100 may comprise a circuit board 102 supporting various components. For example, in various embodiments, the circuit board 102 comprises a printed circuit board having various conductors printed thereon. As illustrated in FIG. 4A, the circuit board 102 supports the first target sensor 110, second target sensor 120, first ambient sensor 130, second ambient sensor 140, and sensor controller 150. Each of the first target sensor 110, second target sensor 120, first ambient sensor 130, and second ambient sensor 140 may comprise elements of a capacitor, such that each of the sensors 110, 120, 130, 140 are configured to detect a capacitance in an electric field formed between sensor components. Moreover, in various embodiments the circuit board 102 comprises a material configured to minimize the extent to which the electric fields generated by the sensors 110, 120, 130, 140 extend through the circuit board. For example, in various embodiments, the circuit board 102 comprises an FR-4 grade epoxy laminate material.

As shown in FIG. 4A, the first target sensor 110 may comprise a first target transmitter electrode 111 and a first target receiver electrode 112. Similarly, the second target sensor 120 may comprise a second target transmitter electrode 121 and a second target receiver electrode 122. Moreover, the first ambient sensor 130 may comprise a first ambient transmitter electrode 131 and a first ambient receiver electrode 132. Finally, the second ambient sensor 140 may comprise a second ambient transmitter electrode 141 and a second ambient receiver electrode 142.

As illustrated in FIG. 4A, each of the electrodes 111, 112, 121, 122, 131, 132, 141, 142 comprise an elongated quadrilateral plate being coupled to or printed on the circuit board 102. Moreover, as illustrated in FIG. 4A, the printed circuit board comprises a flat surface upon which the electrodes 111, 112, 121, 122, 131, 132, 141, 142 are printed, and therefore the electrodes are coplanar when printed thereon. In various embodiments, the electrodes 111, 112, 121, 122, 131, 132, 141, 142 may comprise a conductive material, such as copper, and may be coated in a solder mask material. In various embodiments, each of the electrodes 111, 112, 121, 122, 131, 132, 141, 142 may have a width D1 of 200 mils and a length D2 of 920 mils. Each electrode pair forming a sensor may be spaced such that a small gap D3 exists between the electrodes forming the electrode pair. For example, the gap between the electrodes may be 30 mils. Moreover, as illustrated in FIG. 4A, the first ambient sensor 130 and second ambient sensor 140 may be spaced such that a gap D4 exists therebetween. For example, in various embodiments the gap D4 between the first ambient sensor 130 and second ambient sensor 140 is 270 mils. As illustrated in FIG. 4A, each target sensor 110, 120 is spaced from the corresponding ambient sensor 130, 140 such that a gap D5 exists therebetween. For example, in one embodiment, the gap D5 is 2420 mils. Additionally, the first target sensor 110 is spaced a distance D6 away from a first side 102a of the circuit board 102, and the second target sensor 120 is spaced a distance away from a second side 102b of the circuit board 102. In the illustrated embodiment of FIG. 4A, the distance D6 between the first target sensors 110 and its corresponding side 102a is equivalent to the distance between the second target sensor 120 and its corresponding side 102b. For example, in one embedment, the distance D6 is 285 mils.

Moreover, in various embodiments the electrodes 111, 112, 121, 122, 131, 132, 141, 142 are configured to generate one or more at least substantially clear signals capable of additional signal processing. For example, in various embodiments the width D1, length D2, and gap D3 of the electrodes 111, 112, 121, 122, 131, 132, 141, 142 are sized so as to generate an electric field and between corresponding transmitter electrodes and receiver electrodes, and to generate a resulting signal indicative of the capacitance between each electrode pair that may be utilized in additional processing.

Figure 4B:
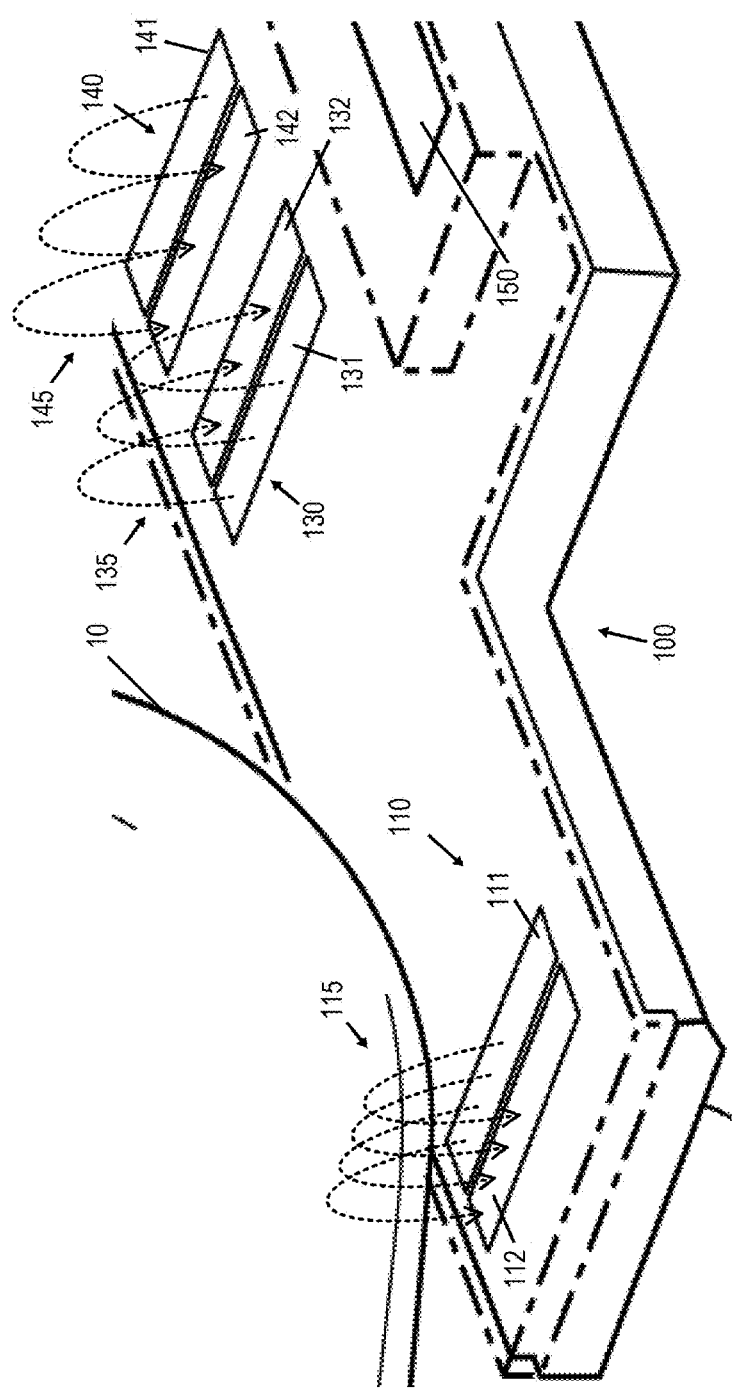
FIG. 4B is a detailed perspective view of the fluid level sensor showing the electric fields generated by the fluid level sensor according to one embodiment.

In the illustrated embodiment of FIG. 4B, the sensors 110, 120, 130, 140 are spaced such that an electric field generated by one sensor does not substantially interfere with another sensor. For example, the first ambient sensor 130 is located outside of an electric field generated by a first target sensor 110. Each sensor 110, 120, 130, 140 is configured to generate an electric field in order to measure the capacitance of a measurement zone surrounding each sensor 110, 120, 130, 140. For example, as shown in FIG. 4B, the first target sensor 110 is configured to generate an electric field 115 and measure the capacitance of a target zone. As discussed in greater detail below, the first target sensor 110 is positioned such that the target zone encompasses a target portion of the first container's internal fluid volume. Similarly, the second target sensor 120 is configured to generate a second electric field (not shown) and measure the capacitance of a second target zone. The second target sensor 120 is positioned such that the target zone encompasses a target portion of the second container's internal fluid volume.

As shown in FIG. 4B, the first ambient sensor 130 is configured to generate a first ambient electric field 135 and measure the capacitance of a first ambient zone. Likewise, the second ambient sensor 140 is configured to generate a second ambient electric field 145 and measure the capacitance of the second ambient zone. The first ambient sensor 130 and second ambient sensor 140 are positioned such that the first ambient zone and second ambient zone encompass only ambient air, and do not include any portion of the first and second fluid containers 10, 20.

In various embodiments, the measurement zones of adjacent sensors may not overlap. For example, the target zone of the first target sensor 110 may not overlap the ambient zone of the first ambient sensor 130. Moreover, the ambient zone measured by the first ambient sensor 130 may be spaced such that only ambient air is within the ambient zone, and no portion of the fluid container 10 is within the ambient zone.

Referring now to FIG. 5, each of the sensors 110, 120, 130, 140 are in communication with the sensor controller 150. As illustrated in the schematic diagram of FIG. 5, the sensor controller 150 comprises one or more processors and a plurality of input and output ports. As a non-limiting example, the sensor controller 150 comprises a 12-bit Capacitance-to-Digital Converter, such as the AD7152 converter by Analog Devices. In various embodiments, a first output port of the sensor controller 150 is in communication with both the first target transmitter electrode 111 and first ambient transmitter electrode 131. Likewise, a second output port of the sensor controller 150 is in communication with both the second target transmitter electrode 121 and second ambient transmitter electrode 141. As illustrated in FIG. 5, one or more low pass filters 151a-f may be utilized to minimize the influence of electrical noise in signals received by the sensor controller 150.

In various embodiments, the sensor controller 150 is configured to transmit alternating current (AC) and/or digital pulse output signals to the transmitter electrodes 111, 121, 131, 141 via the first and second output ports. Moreover, the sensor controller 150 is configured to transmit output signals at least periodically, regularly, and/or the like. As will be described in greater detail herein, the sensor controller 150 is configured to transmit a first output signal via the first output port before a second output signal is transmitted via the second output port.

As illustrated in FIG. 5, the sensor controller 150 has a plurality of input ports in communication with each of the receiver electrodes 112, 122, 132, 142. As illustrated in FIG. 5, one or more low pass filters 151a-f may be utilized to minimize the influence of electrical noise in signals received by the sensor controller 150.

Although not shown as a separate component, the sensor controller 150 may additionally comprise an analogue-to-digital converter configured to convert analogue signals received from each of the receiver electrodes 112, 122, 132, 142 into one or more digital signals. The sensor controller 150 may also be in communication with the main controller 200 via one or more connectors.

Placement of Fluid Level Sensor

Figure 6:
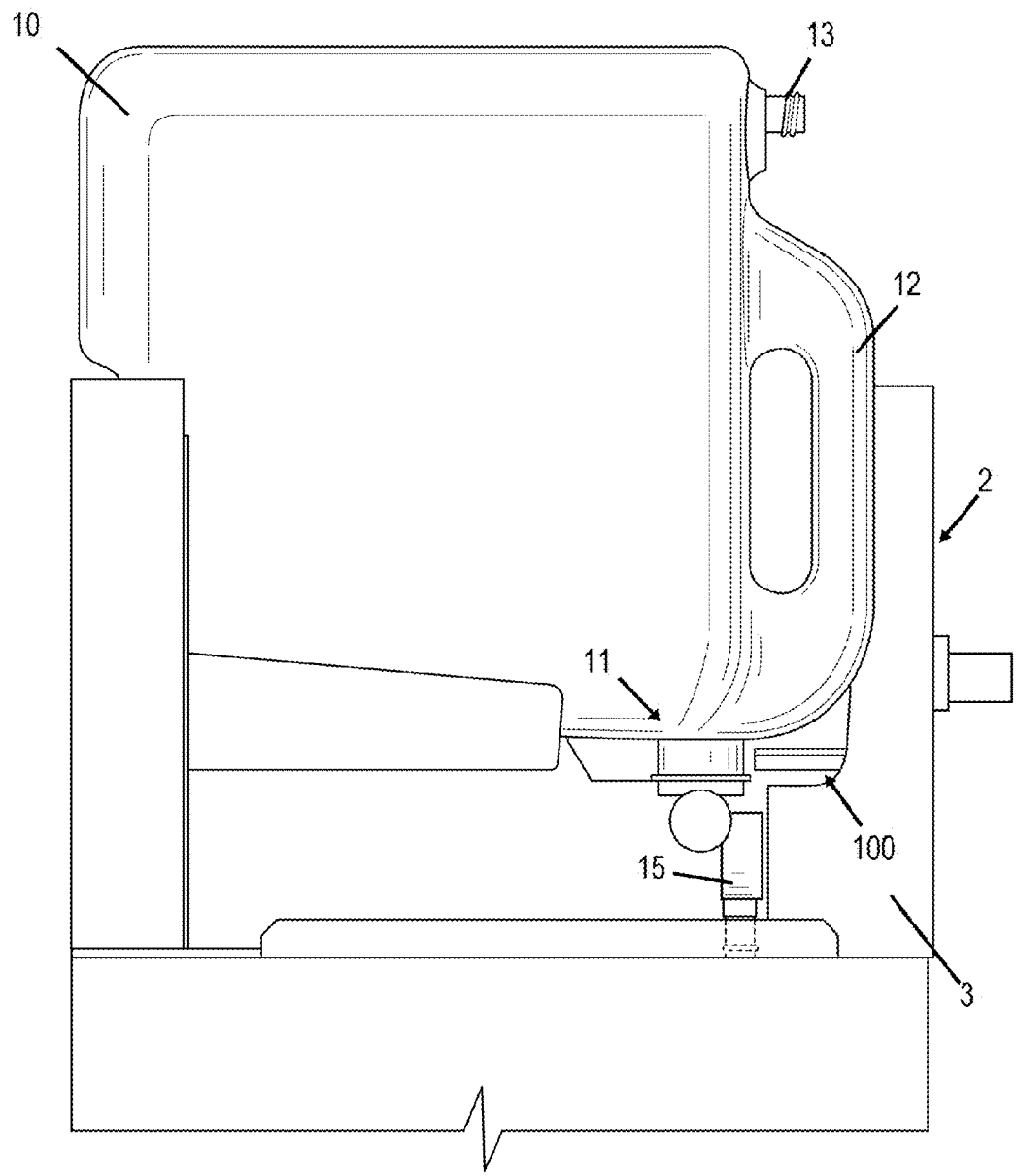
FIG. 6 is a side view of the fluid dispensing system showing an exemplary placement of a fluid level sensor in relation to a fluid container.
Figure 7:
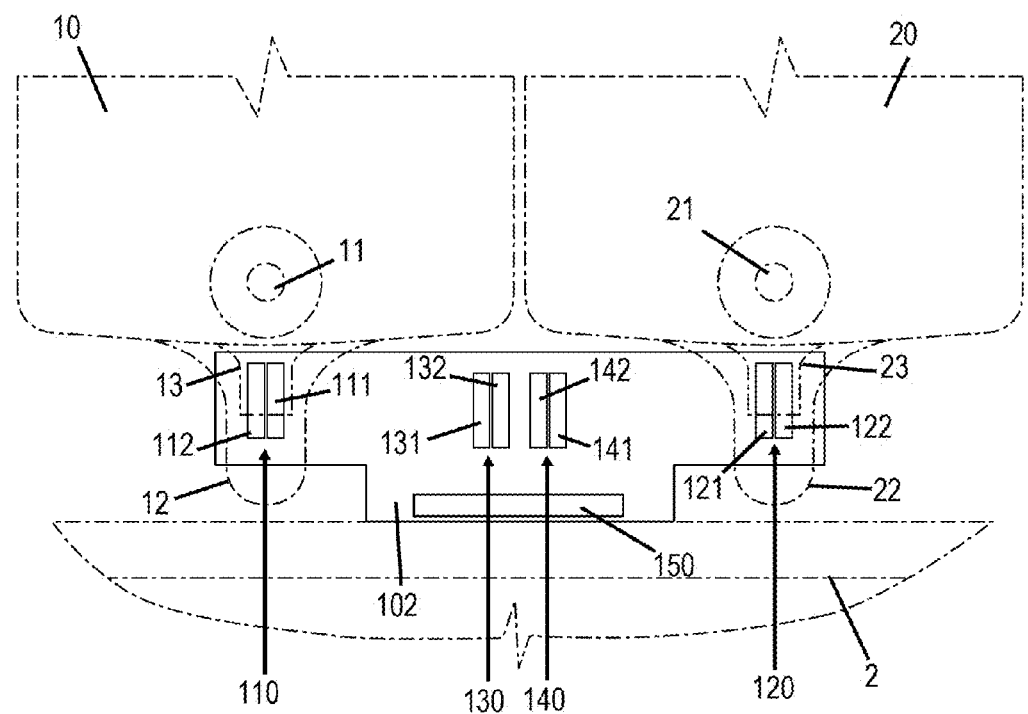
FIG. 7 is a top view showing an exemplary placement of a fluid level sensor in relation to fluid containers.

Referring now to FIGS. 6 and 7, an exemplary sensor placement is described. Specifically, FIG. 6 illustrates a side profile view of a sensor 100 relative to a fluid container 10. As illustrated therein, the sensor 100 is aligned below at least a portion of the fluid container 10 (e.g., below the handle 12). In various embodiments, an upper surface of the sensor 100 is located vertically below at least a portion of the fluid container 10, near the fluid exit 11, such that a target zone corresponding with a target sensor (e.g., sensor 110) encompasses at least a portion of the fluid container 10. By placing the sensor 100 near the fluid exit 11, the fluid sensor is able to detect changes in fluid level occurring proximate the fluid exit 11 occurring when fluid is being removed from the fluid container 10 by the pump 15. Moreover, as shown in FIG. 6, the upper surface of the sensor 100 is spaced from—but substantially adjacent to—a lower surface of the fluid container 10.

As shown in FIG. 7, the sensor 100 is positioned such that the first target sensor 110 is below at least a portion of the first fluid container 10, and the second target sensor 120 is below at least a portion of the second fluid container 20. For example, in the illustrated embodiment of FIG. 7, the first target sensor 110 may be directly below the handle 12 of the first fluid container 10, and the second target sensor 120 may be directly below the handle of the second fluid container 20. By positioning the first target sensor 110 below at least a portion of the first fluid container 10, and the second target sensor 120 below at least a portion of the second fluid container 20, the first target zone and second target zone encompasses at least a portion of the first fluid container 10, and second fluid container 20, respectively.

As can be appreciated from FIGS. 6 and 7, the first target capacitance sensor 110, and first ambient sensor 130 are aligned such that a first plane perpendicular to a face of the electrodes 111, 112, 121, 122, 131, 132, 141, 142 intersects a medial portion of each of the electrodes. As shown in FIG. 7, the first plane is parallel to a front face of the circuit board 102 located proximate the access door 2, when the sensor 100 is installed in a fluid dispensing system 1. Moreover, as is evident from FIGS. 6 and 7, a second plane perpendicular to the face of the electrodes 111, 112, 121, 122, 131, 132, 141, 142, and perpendicular to the first plane extends through the small gap located between the first target transmitter electrode 111 and the first target receiver electrode 112, and through the handle 12 of the first container 10. Similarly, a third plane perpendicular to the face of the electrodes 111, 112, 121, 122, 131, 132, 141, 142, and perpendicular to the first plane extends through the small gap located between the second target transmitter electrode 121 and the second target receiver electrode 122, and through the handle 22 of the first container 20.

Moreover, as can be appreciated from FIG. 7, a vertical axis perpendicular to the face of the electrodes 111, 112, 121, 122, 131, 132, 141, 142 (e.g., extending out of the page in the illustrated embodiment of FIG. 7) extends through a portion of the first container 10 (e.g., the handle 12) and through the first target sensor 110. Similarly, a second vertical axis perpendicular to the face of the electrodes 111, 112, 121, 122, 131, 132, 141, 142, extends through a portion of the second container 20 (e.g., the handle 22) and through the second target sensor 120.

As illustrated in FIG. 7, the first and second ambient sensors 130, 140 are positioned such that the fluid containers 10, 20 are not above the ambient sensors 130, 140. By positioning the ambient sensors 130, 140 such that an open volume of ambient air exists above the ambient sensors, the first ambient zone and second ambient zone encompass only ambient air, and consequently the ambient sensors 130, 140 obtain a measurement of the ambient conditions alone, without influence from the fluid and/or fluid containers 10, 20. This benefit is further promoted by spacing the ambient sensors 130, 140 away from the target sensors 110, 120 such that the electric fields generated by each of the target sensors 110, 120 are not detected by the ambient sensors 130, 140. Moreover, as shown in FIGS. 2, 3, 6, and 7, each of the sensors 110, 120, 130, 140 may be coplanar, and positioned in a plane existing below the fluid containers 10, 20.

Although the placement of a sensor is described in relation to a first fluid container 10 and a second fluid container 20, it should be understood that any number of fluid containers may be utilized in combination with a corresponding number of fluid sensors.

Operation of the Fluid Sensing System

Figure 8A:
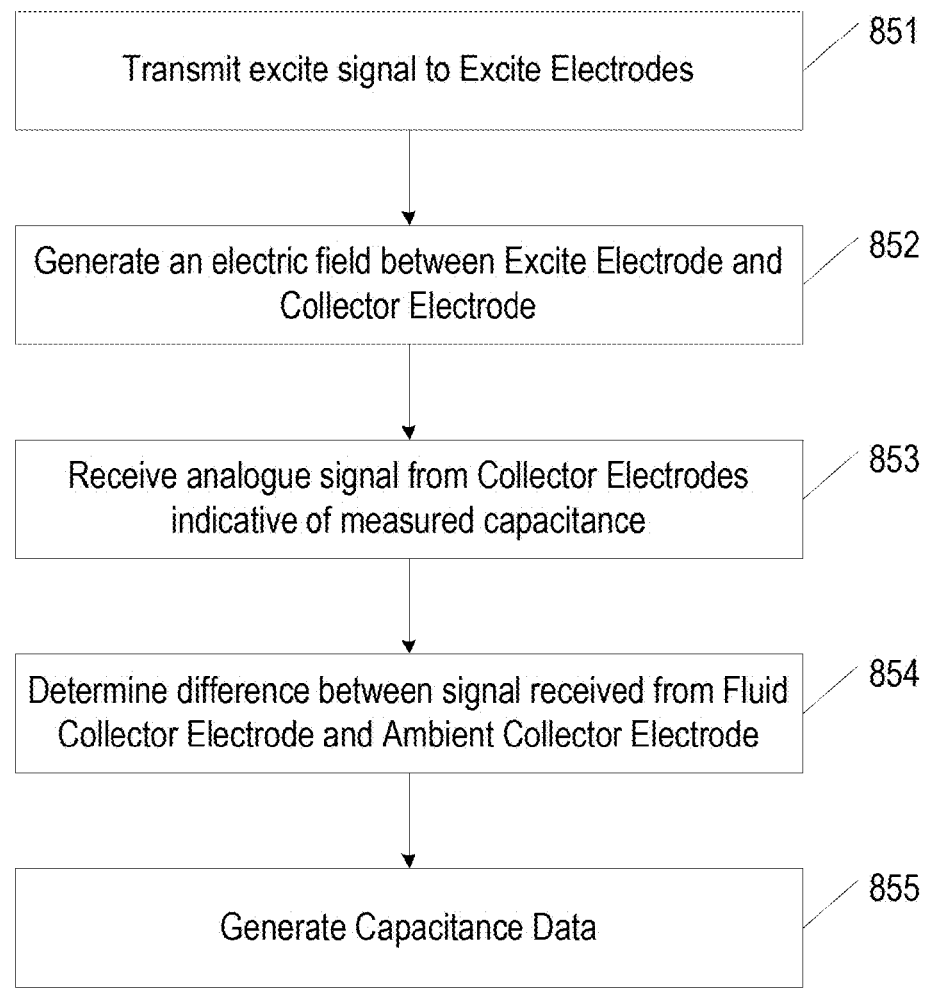
FIG. 8A is a flowchart illustrating steps for measuring the capacitance of a measurement zone according to one embodiment.

FIG. 8A illustrates exemplary steps carried out by the sensor controller 150 for monitoring and recording a capacitance reading. The sensor controller 150 begins at Step 851 by transmitting an excite signal to the transmitter electrodes 111, 131. As illustrated in FIG. 5, in various embodiments the target transmitter electrode 111 and ambient transmitter electrode 131 are connected in parallel communication with the sensor controller 150 such that a single excite signal transmitted from the sensor controller 150 is received by the target transmitter electrode 111 and the ambient transmitter electrode 131 at least substantially simultaneously. Moreover, as illustrated in FIG. 5, the signal may be transmitted through one or more electrical noise filters 151a-f (e.g., a low pass filter) in order to minimize the impact of electrical noise received by the sensor controller 150. In embodiments comprising multiple target sensors (e.g., having a first target sensor 110 and a second target sensor 120), the sensor controller 150 may be configured to alternate between generating and transmitting a first excite signal to the first transmitter electrodes 111, 131 and a second excite signal to the second transmitter electrodes 121, 141. Consequently, the sensor controller 150 is also configured to alternate between receiving signals from the first receiver electrodes 112, 132, and receiving signals from the second receiver electrodes 122, 142.

Referring again to FIG. 8A, an electric field is generated between the transmitter electrodes 111, 131, and the respective receiver electrodes 112, 132 at Step 852. Due to the configuration of the target sensor 110 and ambient sensor 130 as described in relation to FIGS. 2, 3, 6, and 7, at least a portion of the electric field generated by the target sensor 110 encompasses at least a portion of the fluid container 10 and the internal fluid volume. Moreover, the electric field generated by the ambient sensor 130 encompasses only a zone of ambient air surrounding the ambient sensor 130. Moreover as previously indicated, the electric field generated by the target sensor 110 does not overlap the electric field generated by the ambient sensor 130.

Upon transmitting the excite signals to the sensors, which consequently generate the electric field between the transmitter electrodes 111, 131 and the respective receiver electrodes 112, 132, the sensor controller 150 continues at Step 853 of FIG. 8A. As illustrated therein, sensor controller 150 receives a first analogue signal indicative of the capacitance between the target transmitter electrode 111 and the target receiver electrode 112 and a second analogue signal indicative of the capacitance between the ambient transmitter electrode 131 and the ambient receiver electrode 132. At Step 854, the sensor controller 150 determines the difference between the capacitance measured by the target sensor 110 and the capacitance measured by the ambient sensor 130.

By determining the difference between the capacitance measured by the target sensor 110 and the capacitance measured by the ambient sensor 130, the sensor controller 150 determines a combined capacitance that may be indicative of a capacitance of the fluid within the fluid container 10. Moreover, due to the placement of the ambient sensor 130 relative to the fluid container 10, the capacitance measured by the ambient sensor 130 includes a capacitance due to ambient conditions existing within the measured ambient zone alone. Therefore, the difference between the capacitance measured by the target sensor 110 and the capacitance measured by the ambient sensor 130 is at least substantially equivalent to the capacitance attributable to the fluid within the fluid container 10, alone.

The process continues at Step 855 at which the sensor controller 150 generates capacitance data indicative of the capacitance of the fluid within the fluid container 10. In various embodiments, the capacitance data may be transmitted from the sensor controller 150 to the main controller 200 for additional processing. Moreover, although not indicated in FIG. 8A, the sensor controller converts the analogue signal indicative of the capacitance of the fluid within the fluid container 10 into a digital signal prior to generation of the capacitance data.

Figure 8B:
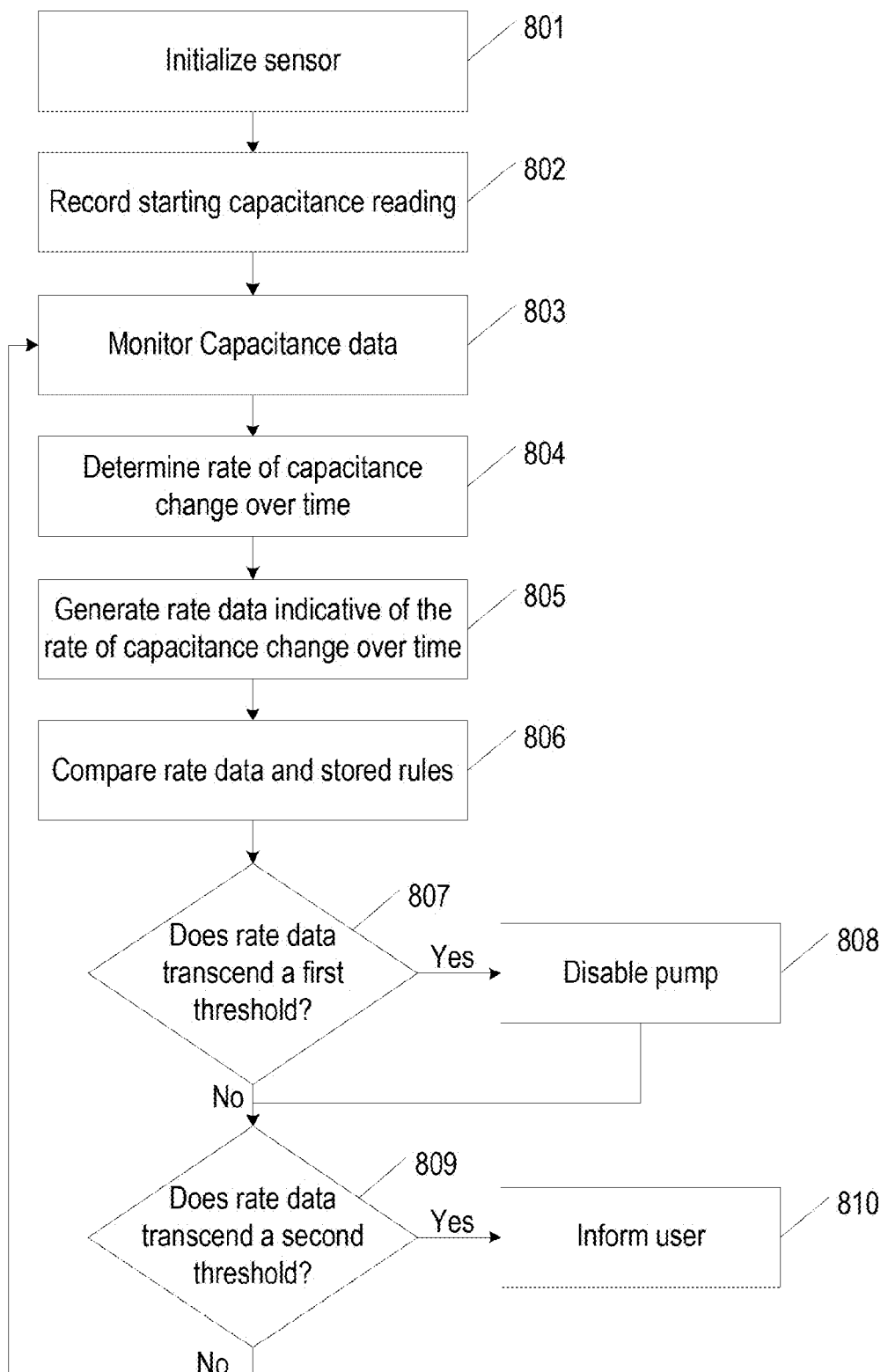
FIG. 8B is a flowchart illustrating steps for determining a fluid level in a fluid container according to one embodiment.

FIG. 8B illustrates exemplary steps executed by the fluid dispensing system's main controller 200 for monitoring the fluid level in one or more of the containers 10, 20 according to various embodiments of the present invention. Although described in relation to a single fluid container and single fluid sensor for the sake of brevity, it should be understood that any number of fluid containers may be utilized in combination with a corresponding number of fluid sensors.

As shown in FIG. 8B, the main controller 200 begins at Step 801 by initializing the fluid level sensor 100. During the initialization process, the main controller 200 determines whether the fluid level sensor 100 is functioning properly, and determines whether a removable fluid container 10 is properly placed in proximity to the sensor 100. The main controller 200 receives data indicative of an initial measured capacitance from the sensor controller 150 and determines whether the initial measured capacitance is within an acceptable range. For example, a determination that the initial measured capacitance is higher than an acceptable range may indicate that fluid is present on the surface of the sensor 100, and therefore the sensor 100 will not function properly until the fluid is removed. Similarly, a determination that the initial measured capacitance is lower than an acceptable range may indicate that an empty fluid container is installed in proximity to the sensor, or that no fluid container is installed. In various embodiments, upon a determination that the initial measured capacitance is outside of the acceptable range, the main controller 200 may be configured to generate an alert to be displayed to a user via a display device.

Moreover, the initialization process occurring at Step 801 may occur at one or more times during operation. For example, the main controller 200 conducts the steps involved in the initialization process immediately following a user turning on the fluid dispensing system 1, immediately before initialization of a pump 15 in fluid communication with the fluid container 10, immediately following initialization of a pump 15, or at any other time during operation.

Upon a determination that the initial measured capacitance is within an acceptable range, the main controller 200 next executes Step 802 at which a starting capacitance reading is received from the sensor controller 150 and recorded. In various embodiments, the starting capacitance is recorded after the pump 15 is initiated. As will be described in greater detail in reference to FIG. 8A, the starting capacitance reading may be determined based at least in part on a capacitance reading taken from a target sensor 110 and a capacitance reading taken from an ambient sensor 130.

As shown in FIG. 8B, the process may continue at Step 803 at which the main controller 200 monitors capacitance data over time. At Step 803, the main controller 200 receives a plurality of capacitance readings from the sensor controller 150 indicative of capacitance readings recorded at discrete points in time. Such readings may be taken at various frequencies, such as between 30 kHz and 33 kHz, although other measurement frequencies are also contemplated. In various embodiments, the process of monitoring the capacitance data may comprise determining a moving average capacitance reading based on, for example, the most recent 3 capacitance readings, in order to ensure outlier data points are not considered in later processing.

Moreover, the process of monitoring capacitance data comprises steps for receiving capacitance data from the sensor controller 150 indicative of measurements received from a target sensor 110 and an ambient sensor 130. As described herein, the target sensor 110 is configured to generate an electric field and, based on the generated electric field, determine a capacitance between a target transmitter electrode 111 and a target receiver electrode 112. Likewise, the ambient sensor 130 is configured to generate an electric field and, based on the generated electric field, determine a capacitance between an ambient transmitter electrode 131 and an ambient receiver electrode 132. The capacitance data is received by the sensor controller 150 from the target sensor 110 and the ambient sensor 130 at least substantially simultaneously, such that each piece of capacitance data received from the target sensor 110 has a corresponding piece of data received from the ambient sensor 130. As previously indicated, the sensor controller 150 combines the capacitance data received from the target sensor 110 and the capacitance data received from the ambient sensor 130 to form combined capacitance data, and the main controller 200 receives the combined capacitance data as input from the sensor controller 150 during Step 803. In various embodiments, the sensor controller 150 generates the combined capacitance data based on input received from the target sensor 110 and the ambient sensor 130, and outputs the combined capacitance data to the main controller 200 to execute additional steps. As a non-limiting example, for each capacitance reading obtained by the target sensor 110, the combined capacitance data may be the difference between the capacitance reading obtained by the target sensor 110 and the corresponding capacitance reading obtained by the ambient sensor 130.

Figure 9:
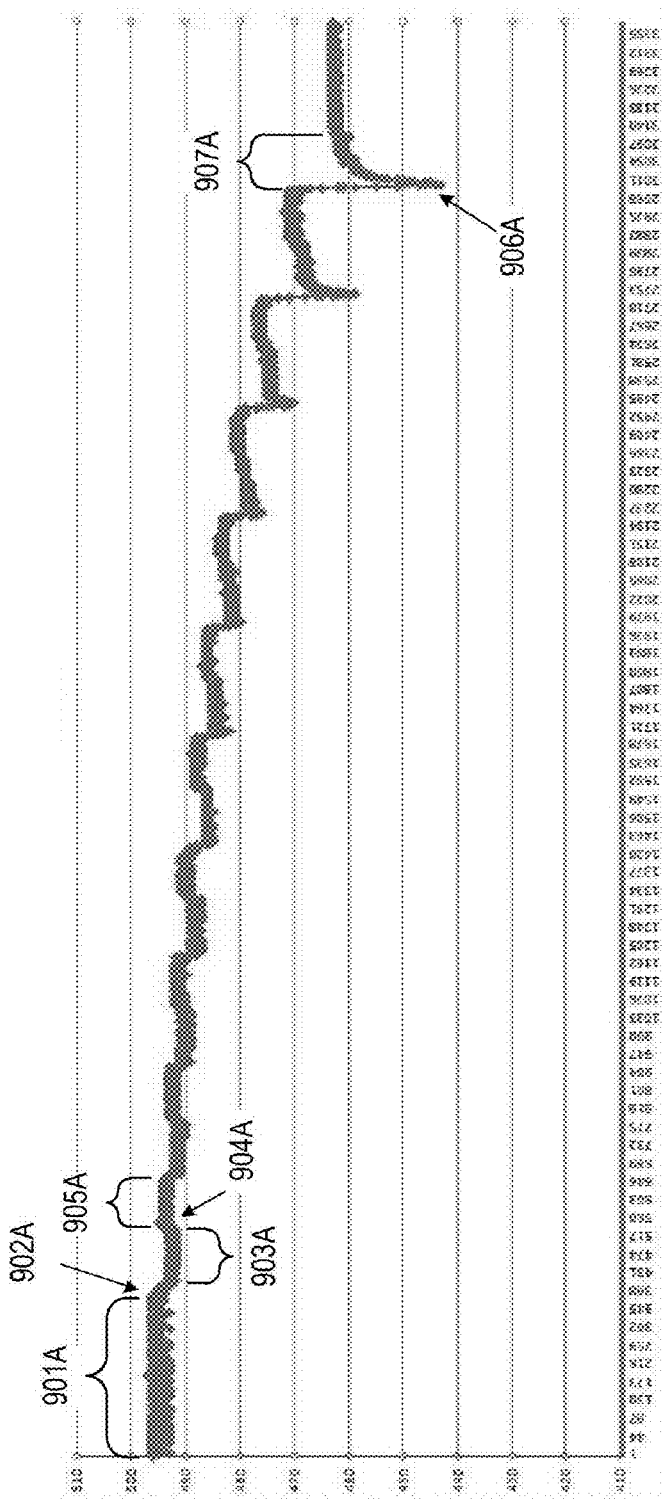
FIG. 9 is a chart illustrating exemplary sensor measurements as a function of time.

FIG. 9 graphically illustrates capacitance data generated by the sensors 110, 120 and transmitted via the sensor controller 150 to the main controller 200 over time. Specifically, FIG. 9 illustrates several periods of time during which a pump 15 is active to remove fluid from the fluid container 10, during a period of time when the fluid container was near a low fluid state. As shown in FIG. 9, the capacitance data received by the main controller 200 during the period of time labeled 901A represents a period of time during which the fluid had not yet reached a low fluid level within the fluid container 10. As shown during time period 901A, the determined rate of change of the capacitance was minimal even when the pump 15 was removing fluid from the fluid container 10, resulting in a substantially horizontal line portion. Time 902A is representative of a time at which the pump 15 is activated and the fluid level within the fluid container 10 is low. The capacitance data received by the main controller 200 during time 902A decreases during subsequent measurements until it reaches a local minimum a short time thereafter during time period 903A. The pump 15 may be configured to remove fluid from the fluid container 10 during a cycle period (e.g., a cycle period comprises time period 902A and time period 903A). Each cycle period may have a corresponding local minimum as illustrated in FIG. 9. In various embodiments, each cycle period may be a fixed length of time (e.g., 2 seconds) as illustrated in FIG. 9. However, in various embodiments, each cycle period may be a different length of time, and consequently the each local minimum may occur over a different period of time. Referring again to FIG. 8B in reference to FIG. 9, the rate of capacitance change at time 902A (e.g., the period of time immediately following activation of the pump) may transcend the second threshold at Step 809.

Upon the completion of a cycle period, the main controller 200 disables the pump at time 904A. The length of time of a cycle period, and the subsequent completion of a cycle period may correspond to a predetermined amount of fluid being dispensed from the container 10. At time 904A, the measured capacitance increases to a local maximum occurring during time frame 905A. Each local maximum reflects the measured capacitance of the fluid having a steady fluid level (e.g., when the pump 15 is not removing fluid from the container 10). Although each local maximum is approximately the same length of time in FIG. 9, it should be understood that the time period between pump activations may be dependent on various external factors, such as when a user of the fluid dispensing system 1 requests additional fluid to be dispensed from the fluid container 10, or the amount of time the fluid dispensing system 1 is idle.

As illustrated in FIG. 9, the change in capacitance between a local minimum and a local maximum is repeated each time the main controller 200 activates and deactivates the pump 15, with the measured local maximum decreasing after each subsequent pump deactivation.

Referring again to FIG. 8B, at Step 804, the main controller 200 determines a capacitance measurement, such as a rate of capacitance change over time, based at least in part on the monitored capacitance data. In various embodiments, the main controller 200 determines the rate of capacitance change over time based on the combined capacitance data received from the sensor controller 150. Based on the determined rate of capacitance change over time, the main controller 200 generates rate data indicative of the rate of capacitance change over time at Step 805.

At Step 806 of FIG. 8B, the main controller 200 compares the capacitance measurement against stored rules. In various embodiments, the stored rules comprise one or more threshold values indicative of one or more trip points. The one or more trip points may be set based at least in part on various measured fluid levels within a fluid container 10. For example, in one embodiment, a threshold value (or range of values) is associated with of a "low fluid" trip point, while another threshold value (or range of values) is associated with a "container empty" trip point. In such an embodiment, the threshold value associated with the low fluid trip point is one that corresponds to a fluid level that is low, but not nearly empty. By contrast, the threshold value associated with the container empty trip point is one that corresponds to a fluid level that is at least substantially empty, although other threshold values are also within the scope of the present disclosure. Moreover, the titles of the various trip points should not be construed as limiting, and instead should be considered as merely exemplary. Because the threshold values may be embodied as threshold capacitance rate of change values, the threshold values need not correspond to a particular fluid level remaining in a fluid container 10. In various embodiments, the threshold values may be expressed as a maximum change in combined capacitance over a predefined period of time. The maximum change may be a maximum increase in combined capacitance (e.g., a positive change in combined capacitance) or a maximum decrease in combined capacitance (e.g., a negative change in combined capacitance).

Upon a determination that the capacitance measurement transcends a threshold value (e.g., the change in capacitance measurement is greater than a maximum change in capacitance over a predefined period of time), one or more responsive actions may be taken at Steps 807-810. For example, at Step 807, the main controller 200 determines whether the rate data transcends a first threshold. Such first threshold may correspond to a determination that the fluid container 10 is at least substantially empty. As illustrated with reference to the exemplary data shown in FIG. 9, the main controller 200 may determine that the rate data corresponding to the capacitance data recorded at time 906A transcends the first threshold. In various embodiments, the pump 15 may continue to pump for a predetermined amount of time (during time period 907A), however the pump 15 may thereafter be prevented from being activated until the fluid container 10 is refilled or replaced with another fluid container 10 containing fluid. Moreover, in various embodiments, upon a determination that the rate of change of the measured capacitance transcends a predetermined threshold, main controller 200 disables the pump 15 prior to completion of a cycle period at Step 808 of FIG. 8B. Although illustrated as disabling the pump 15 at Step 808, the main controller 200 may execute alternative or additional response actions upon a determination that the rate data exceeds a first threshold. For example, the main controller 200 may generate and display an alert via a display device in order to inform the user that the container 10 is at least substantially empty. In various embodiments, the process may end after a determination that the rate data transcends at least one of the threshold values. As illustrated in FIG. 8B, upon a determination that the rate data does not transcend a first threshold value, the main controller 200 determines whether the rate data exceeds a second threshold value at Step 809. In various embodiments, the second threshold value has an absolute value less than the first threshold value examined at Step 807, such that the rate data may transcend the second threshold value without transcending the first threshold value. For example, the second threshold value is indicative of a "low fluid" trip point indicative of a fluid level that is not at least substantially empty. In various embodiments, the second threshold is set such that the rate data will transcend the second threshold whenever the fluid level inside the container falls below a predetermined level (e.g., approximately 30% of the fluid remaining). However, as previously noted, the second threshold value may correspond to a particular rate of change of capacitance, without regard to a particular fluid level remaining in the container 10. For example, the main controller 200 is configured to determine whether the rate of change of the combined capacitance data transcends the second threshold value. With reference to FIG. 9, the main controller 200 may determine that the rate of change occurring at time 902A transcends a second threshold value. In various embodiments, each of the threshold values (e.g., the first threshold value and second threshold value) can be adjusted in reference to various physical properties of the fluid to be stored in the fluid container 10. For example, the threshold values may be calibrated based at least in part on the dielectric constant of the fluid.

As illustrated in FIG. 8B, upon a determination that the rate data transcends the second threshold value, the main controller 200 executes a response action at Step 810. For example, as illustrated in FIG. 8B, the main controller generates and displays an alert to the user via a display device in order to inform the user of the low fluid level. However, if the rate data is not determined to transcend the second threshold at Step 809, the illustrated process proceeds to repeat Steps 803-810 for subsequently obtained capacitance data. Although not illustrated, in various embodiments, the main controller 200 may compare the rate data against additional threshold values, and may execute additional responsive actions upon a determination that the rate data transcends one or more of the additional threshold values.

Although the above steps are described as performed by the sensor controller 150 and/or the main controller 200, in various embodiments, the steps described in reference to FIGS. 8A-9 may be performed entirely by one of the sensor controller 150 and the main controller 200. Moreover, in various embodiments, the sensor controller 150 and main controller 200 are embodied as a single component or collection of components, such that steps described as performed by the sensor controller 150 and steps described as performed by the main controller 200 are executed by the single component or collection of components.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A fluid dispensing system comprising:
   a container defining an internal fluid volume configured for storing and dispensing fluid;
   a target capacitance sensor comprising a target transmitter electrode and a target receiver electrode that are coplanar with one another and positioned a distance away from the container, the target capacitance sensor being configured to generate a target electric field to detect a capacitance of a target zone comprising a target portion of the container's internal fluid volume;
an ambient capacitance sensor comprising an ambient transmitter electrode and an ambient receiver electrode that are positioned a distance away from the container, the ambient capacitance sensor being configured to generate an ambient electric field to detect a capacitance of an ambient zone outside of the container; and
one or more processors in communication with the target capacitance sensor and the ambient capacitance sensor, the one or more processors configured to generate a signal indicative of the level of fluid present within the internal fluid volume based at least in part on the capacitance detected by the target capacitance sensor and the capacitance detected by the ambient capacitance sensor.

2. The fluid dispensing system of claim 1, wherein the target capacitance sensor is positioned such that it is aligned with the target portion of the container, and wherein the ambient capacitance sensor is positioned such that it is not aligned with the container.

3. The fluid dispensing system of claim 2, wherein:
the target capacitance sensor is aligned with the target portion of the container such that a vertical axis perpendicular to a face of the target transmitter electrode extends through the target portion of the container and the target capacitance sensor.

4. The fluid dispensing system of claim 2, wherein the target capacitance sensor is positioned below the target portion of the container.

5. The fluid dispensing system of claim 2, wherein the ambient transmitter electrode and the ambient receiver electrode are coplanar with one another and coplanar with the target transmitter electrode and the target receiver electrode.

6. The fluid dispensing system of claim 1, wherein the target zone and the ambient zone do not substantially overlap.

7. The fluid dispensing system of claim 1, further comprising a housing configured to receive the container, and wherein:
the container is removable from the housing; and
the target capacitance sensor and ambient capacitance sensor are provided on a printed circuit board secured to the housing.

8. The fluid dispensing system of claim 1, wherein the signal indicative of the level of fluid present within the internal fluid volume comprises a signal indicating that the level of fluid in the internal fluid volume is less than a predefined threshold fluid level.

9. The fluid dispensing system of claim 8, wherein the one or more processors are additionally configured to:
determine a differential capacitance based at least in part on the capacitance detected by the target capacitance sensor and the capacitance detected by the ambient capacitance sensor;
monitor changes in the differential capacitance over time; and
generate the signal indicative of the level of fluid present within the internal fluid volume upon determining that the differential capacitance has changed more than a threshold amount over a predefined increment of time.

10. The fluid dispending system of claim 8, further comprising a fluid pump, and wherein:
the one or more processors are further configured to disable the fluid pump upon determining that the level of fluid within the fluid volume is less than the predefined threshold fluid level.

11. The fluid dispensing system of claim 1, wherein the container is a first container and the target capacitance sensor is a first target capacitance sensor, the system additionally comprising:
a second container defining a second internal fluid volume configured for storing and dispensing fluid; and
a second target capacitance sensor comprising a second target transmitter electrode and a second target receiver electrode that are coplanar with one another and positioned a distance away from the second container, the second target capacitance sensor being configured to generate a second target electric field to detect a capacitance of a second target zone comprising a target portion of the second container's second internal fluid volume; and wherein:
the one or more processors are in communication with the second target capacitance sensor and the ambient capacitance sensor, the one or more processors configured to generate a signal indicative of the level of fluid present within the second internal fluid volume based at least in part on the capacitance detected by the second target capacitance sensor and the capacitance detected by the ambient capacitance sensor.

12. The fluid dispensing system of claim 11, wherein the second target capacitance sensor is positioned such that it is aligned with the target portion of the second container, and wherein the ambient capacitance sensor is positioned such that it is not aligned with the second container.

13. The fluid dispensing system of claim 11, wherein:
the ambient capacitance sensor comprises:
a first ambient capacitance sensor comprising the ambient transmitter electrode and the ambient receiver electrode; and
a second ambient capacitance sensor comprising a second ambient transmitter electrode and a second ambient receiver electrode that are positioned a distance away from the second container, the second ambient capacitance sensor being configured to generate a second ambient electric field to detect a capacitance of a second ambient zone outside of the second container; and
the one or more processors are in communication with the first target capacitance sensor, the first ambient capacitance sensor, the second target capacitance sensor, and the second ambient capacitance sensor, the one or more processors configured to generate a signal indicative of the level of fluid present within the second internal fluid volume based at least in part on the capacitance detected by the second target capacitance sensor and the capacitance detected by the second ambient capacitance sensor.

14. The fluid dispensing system of claim 13, wherein the first target capacitance sensor, first ambient capacitance sensor, second ambient capacitance sensor, and second target capacitance sensor are coplanar with one another.

15. A capacitive fluid level sensing device comprising:
a target capacitance sensor comprising a target transmitter electrode and a target receiver electrode that are coplanar with one another, the target capacitance sensor being configured to generate a target electric field to detect a target capacitance of a target zone;
an ambient capacitance sensor comprising an ambient transmitter electrode and an ambient receiver electrode that are coplanar with one another and coplanar with the target transmitter electrode and the target receiver electrode, the ambient capacitance sensor being configured to generate an ambient electric field to detect an ambient capacitance of an ambient zone, wherein the ambient zone does not substantially overlap the target zone; and one or more processors configured to:
determine a combined capacitance measurement based at least in part on a differential between the target capacitance and the ambient capacitance; and
generate a signal indicative of the combined capacitance measurement.

16. The capacitive fluid level sensing device of claim 15, wherein the combined capacitance measurement is a differential between the target capacitance and the ambient capacitance.

17. The capacitive fluid level sensing device of claim 15, wherein the target transmitter electrode, target receiver electrode, ambient transmitter electrode and ambient receiver electrode comprise a copper material.

18. The capacitive fluid level sensing device of claim 15, wherein the target capacitive sensor is spaced a distance away from the ambient capacitive sensor.

19. The capacitive fluid level sensing device of claim 15, wherein the target capacitance sensor and ambient capacitance sensor are provided on a printed circuit board.

20. The capacitive fluid level sensing device of claim 19, wherein the target transmitter electrode, target receiver electrode, ambient transmitter electrode and ambient receiver electrode are quadrilateral and positioned adjacent one another.

21. The capacitive fluid level sensing device of claim 15, wherein the target capacitance sensor is a first target capacitance sensor and the target electric field is a first target electric field, the capacitive fluid level sensing device additionally comprising:

a second target capacitance sensor comprising a second target transmitter electrode and a second target receiver electrode that are coplanar with one another, the second target capacitance sensor being configured to generate a second target electric field to detect a second target capacitance of a second target zone; and the one or more processors are additionally configured to determine a second combined capacitance measurement based at least in part on the second target capacitance and the ambient capacitance.

22. The capacitive fluid level sensing device of claim 21, wherein the first target electric field and second target electric field are alternatingly generated.

23. The capacitive fluid level sensing device of claim 21, wherein:
the ambient capacitance sensor comprises:
a first ambient capacitance sensor comprising the ambient transmitter electrode and the ambient receiver electrode; and
a second ambient capacitance sensor comprising a second ambient transmitter electrode and a second ambient receiver electrode that are coplanar with one another and coplanar with the first ambient capacitance sensor, the second ambient capacitance sensor being configured to generate a second ambient electric field to detect a second ambient capacitance of a second ambient zone, wherein the second ambient zone does not overlap the second target zone; and
the one or more processors are configured to determine the second combined capacitance measurement based at least in part on the second target capacitance and the second ambient capacitance.

* * * * *